United States Patent [19]

Paolini

[11] Patent Number: 5,276,866
[45] Date of Patent: Jan. 4, 1994

[54] SYSTEM WITH TWO DIFFERENT COMMUNICATION MEDIUMS, TRANSMITTING RETRIEVED VIDEO AND COMPRESSED AUDIO INFORMATION TO PLURAL RECEIVERS RESPONSIVELY TO USERS' REQUESTS

[76] Inventor: Michael Paolini, 153 E. Palmetto Park Rd. #155, Boca Raton, Fla. 33432

[21] Appl. No.: 221,331

[22] Filed: Jul. 19, 1988

[51] Int. Cl.$^5$ .................................. G06F 13/38
[52] U.S. Cl. .................................. 395/600; 358/86; 358/143; 364/259.9; 364/260.0; 364/260.1; 364/260.4; 364/260.6; 364/282.1; 364/284; 364/284.3; 364/284.4; 364/DIG. 1; 395/200; 395/800
[58] Field of Search .................. 358/86, 143, 147, 257, 358/280, 335, 341, 342; 364/DIG. 1; DIG. 2; 340/825.05; 395/600, 800, 200

[56] References Cited

U.S. PATENT DOCUMENTS

| | | | |
|---|---|---|---|
| 4,028,733 | 6/1977 | Ulicki | 364/900 |
| 4,386,416 | 5/1983 | Giltner et al. | 364/900 |
| 4,422,093 | 12/1983 | Pargee, Jr. | 358/12 |
| 4,429,332 | 1/1984 | Pargee, Jr. | 358/143 |
| 4,429,385 | 1/1984 | Cichelli et al. | 364/900 |
| 4,513,390 | 4/1985 | Walter et al. | 364/900 |
| 4,536,791 | 8/1985 | Campbell et al. | 380/10 |
| 4,549,219 | 10/1985 | Sue et al. | 358/257 |
| 4,581,484 | 4/1986 | Bendig | 379/67 |
| 4,603,385 | 7/1986 | Mueller et al. | 364/200 |
| 4,689,683 | 8/1987 | Efron | 358/185 |
| 4,734,764 | 3/1988 | Pocock et al. | 358/86 |
| 4,780,757 | 10/1988 | Bryer et al. | 358/86 |
| 4,780,758 | 10/1988 | Lin et al. | 358/86 |
| 4,787,035 | 11/1988 | Bourne | 364/300 |
| 4,789,961 | 12/1988 | Tindall | 364/900 |
| 4,815,030 | 3/1989 | Cross et al. | 364/900 |
| 4,816,905 | 3/1989 | Tweedy et al. | 358/86 |
| 4,817,050 | 3/1989 | Komatsu et al. | 364/900 |
| 4,825,303 | 4/1989 | Yablonski et al. | 358/335 |
| 4,858,031 | 8/1989 | Fukuta | 358/342 |
| 4,860,123 | 8/1989 | McCalley et al. | 358/342 |
| 4,888,690 | 12/1989 | Huber | 364/200 |
| 4,905,094 | 2/1990 | Pocock et al. | 358/342 |
| 4,924,303 | 5/1990 | Brandon et al. | 358/86 |
| 5,032,989 | 7/1991 | Tornetta | 364/401 |

Primary Examiner—Thomas C. Lee
Assistant Examiner—M. N. Von Buhr
Attorney, Agent, or Firm—Hopgood, Calimafde, Kalil, Blaustein & Judlowe

[57] ABSTRACT

An interactive video based communication system provides apparatus and methods for user guided information retrieval in video frame format and transmission of the selected and retrieved information to a remote location for subsequent review and analysis. The storage of audio information in video frame format permits real time information compression allowing a one minute presentation to be transmitted in a fraction of a second.

11 Claims, 5 Drawing Sheets

SYSTEM WITH TWO DIFFERENT COMMUNICATION MEDIUMS, TRANSMITTING RETRIEVED VIDEO AND COMPRESSED AUDIO INFORMATION TO PLURAL RECEIVERS RESPONSIVELY TO USERS' REQUESTS

SUMMARY OF THE INVENTION

This invention relates to apparatus and methodology for providing an interactive video based communication system, and more particularly, a system for interactively selecting video based data comprising image, audio and/or text information from a data storage facility and transmitting this information as a video based signal to a remote location for subsequent viewing and analysis.

It is an object of the present invention to permit a user to interactively select portions of video based data from a database storage facility. The video based data will contain picture image information, audio information, and/or text and graphic information. The selected portions are transmitted pursuant to the present invention to the user for viewing and analysis.

It is an additional object of the present invention to combine image, text and audio information into a video signal for retrieval by the user.

It is another object of the present invention to permit the transmission of high definition video images.

It is still another object of the present invention to tag the user selected video based data in a manner to control and monitor its transmission and reception.

Another object of the present invention is the provision of an interactive video based communication system directed to the storage, retrieval and display of video based data pertaining to the sale of real property.

An additional object of the present invention is the provision of an interactive video based communication system directed to the storage, retrieval and display of video based data pertaining to purchasable goods and services.

Still another object of the present invention is the provision of an interactive video based communication system directed to the controlled storage, retrieval and display of video based data pertaining to resorts or vacation locations as used by a network of travel agents.

The above and other objects of the present invention are realized in a specific illustrative program controlled interactive video based processor that operates in concert with input, transmission and display apparatus to access user selected topics in the form of video based data; confirm the quality of the selected data and transmit the selected data in the form of a video signal to a remote location; receive and store the transmitted data at the remote location for subsequent review and analysis.

In accordance with varying aspects of the present invention, the selected data is interactively qualified by the user prior to transmission, thus permitting the user to augment or cancel his request if the selected data is unsatisfactory. In addition, access to the system is by coded entry, creating a simplified means for tracking use and insuring proper transmission and billing for the system service.

BRIEF DESCRIPTION OF THE DRAWINGS

The foregoing features of the present invention may be more fully understood from the following discussion of a specific, illustrative embodiment thereof, presented hereinbelow in conjunction with the accompanying drawing, in which.

DESCRIPTION OF THE PREFERRED EMBODIMENTS

First briefly discussing the invention in overview, the interactive communication system herein described provides user access to a database of information and the capability to select specific portions of the database information for his/her subsequent reception. The database will contain video, audio, and text information organized in a manner to allow the use to interactively "cull out" the information tracks he/she desires. The selected portions of data are tagged (I.D.) pulled out of memory and transmitted to a user location. The selected data, although containing both image and audio information, is transmitted as a video signal at the prevailing industry-accepted standards (e.g. 30 frames per second for video images). The audio portion of the selected data is compressed from real time format for video-signal transmission (e.g. 10 seconds of audio information is stored in one "video" frame and transmitted at 30 frames/second thus providing a 300:1 time compression ratio of the audio signal). In this regard, a video frame is a bit-map of pixel intensity values, and is set by convention at 512×480 pixel locations (a pixel is a picture image element). The audio data is formatted and stored in pixel form on the video frame.

At the user location, the selected data is received, processed, stored and directed to specified output devices, such as monitors, speakers and/or printers. Since the received data is stored, the user can selectively access the data during non-reception intervals. This allows the transmission system to simultaneously support multiple users.

Figure 1:
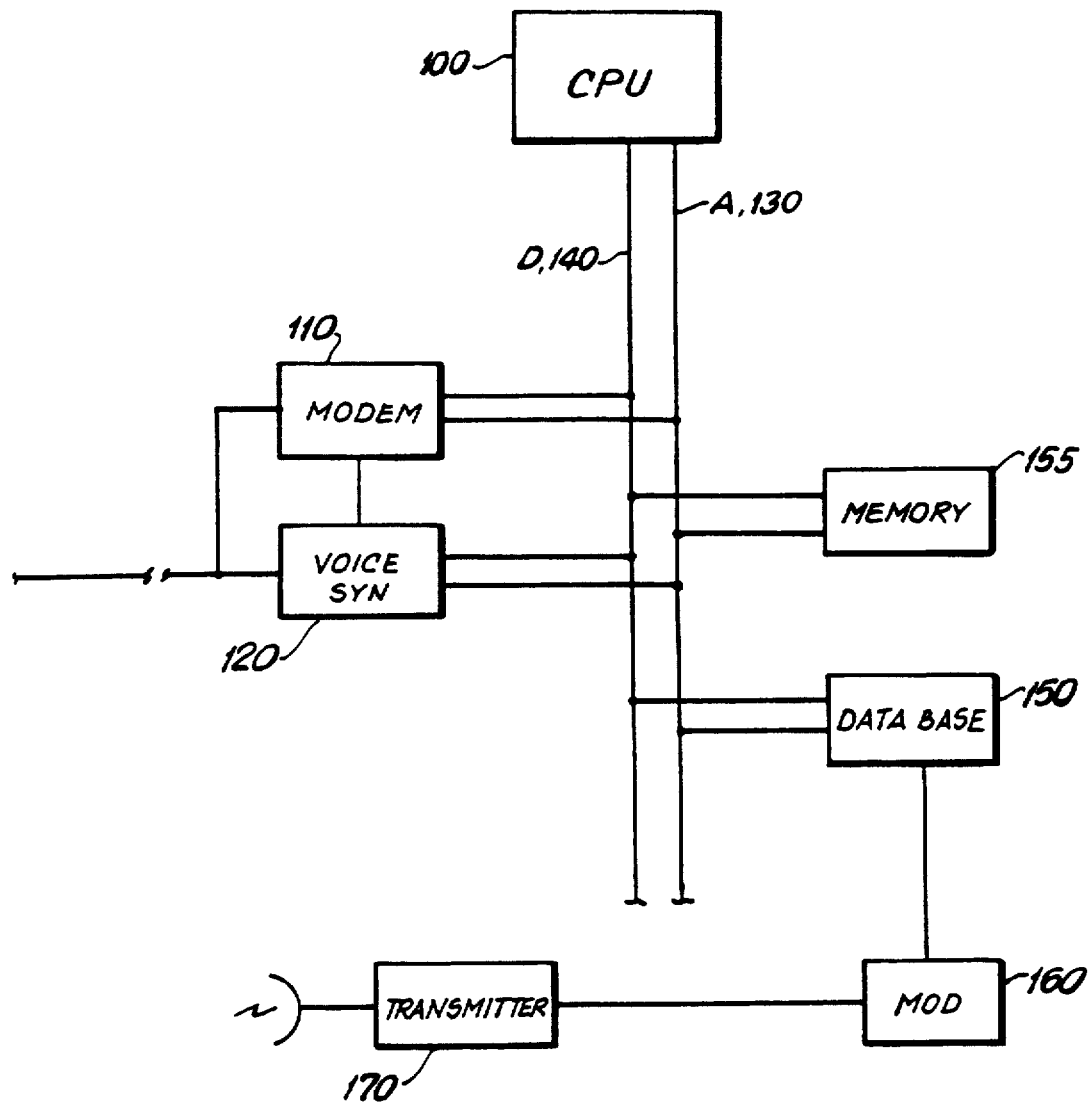
FIG. 1 is a block diagram of video based data storage, retrieval and transmission systems in accordance with the present invention.

With the above overview in mind and referring to FIG. 1, the transmission segment of the present invention is shown in block diagram form. More specifically, a component based system is presented with modem 110 connected to local phone service. The "modem" device (modem is an abbreviation for modulator/demodulator) contains per se well known circuitry for converting data requests received via the telephone wire into digital information suitable for processing vis-a-vis a digital computer. The modem also translates digital information from the computer into a signal compatible with the telephone service. An interactive voice synthesizer/receiver (block 120) is linked with the modem and provides voice output of digital information from the central processor 100.

The central processor unit ("CPU") is designated by numeral 100. The CPU is a digital data processor and operates on per se well known principles of digital computing. System instructions are coded in a form of programming language recognizable by the specific hardware employed. More particularly, the CPU has stored program steps that dictate its operation in response to specific inputs. Any type of programming language can be used as long as it is compatible with the CPU and input/output devices. The CPU is a microprocessor controlled computer such as, inter alia. mainframe, mini, or personal computer, as specifically programmed for the functions delineated below.

CPU 100 is in communication with the various system components via address and data busses 130 and 140, respectively. These communication busses permit the transmission of instructions and data by per se well known means between the memory and output devices of the system via industry standard plug compatible components.

In the present system, the mass storage of information is held in memory database 150. This database can be formed by conventional data storage devices, such as semi-conductor, magnetic disk, or preferably by an optical storage system. The advantage to optical storage of information resides in its non-volatility and its relatively inexpensive capital and operating costs. More particularly, an optical data storage and retrieval device known as a WORM (i.e., write once, read many) provides a data storage medium consisting of micron size pits on the surface of a disk or sheet of polymeric material. These pits are organized into "information tracks" forming digitally encoded information (i.e. in binary codes). Each sheet or disk contains billions of bits of information and provides a file to a database library. In addition, each disk includes a track that defines and summarizes the data stored therein, thus providing a simplified method for evaluating the quality of data without a full analysis of the stored information. Data is retrieved off the disk or sheet by use of a scanning laser. The laser is sensitive to the change in depth of the pits in the polymeric surface and thereby generates a signal corresponding to these pits while rapidly tracking the disk's surface.

The data stored in this format can be of audio, text and/or image information. For example, an information track represents a series of "frames" in that each frame contains binary data sufficient to represent an image at 512×480 pixel locations for a total of approximately 25,000 pixels. The optical scanner generates a video based signal comprising 30 frames per second of video frame information; many of these video frames are preformatted to audio or text data and suitably tagged, thus generating a heterogeneous signal blending audio and text information with picture images, but all in video frame format.

Although discussed above as a discrete device, the database memory can be fully integrated into, and part of, the CPU. Furthermore, stored data can be in analog format, as well as in blended analog/digital or pure digital format.

A data search as requested by the user is controlled by the CPU (See FIG. 3 and the discussion hereinbelow). A search summary is culled from the Database 150 and stored in volatile memory 155. Memory 155 can be one of many well known memory devices, including arrayed random access memory semi-conductors (RAM). The information stored in memory 155 is transient in that its purpose is to guide the user in completing his search. The user reviews these qualitative results and decides whether to quit his search, extend his search, or receive the search in its present form. Once this decision is made the transient data in memory 155 is discarded.

The selected data resulting from the user defined search is culled from the database in the form of a video signal, even though portions or all of the information is audio or text. This video signal is modulated, 160, and transmitted at a carrier frequency by any per se well known transmission means 170.

Figure 3:
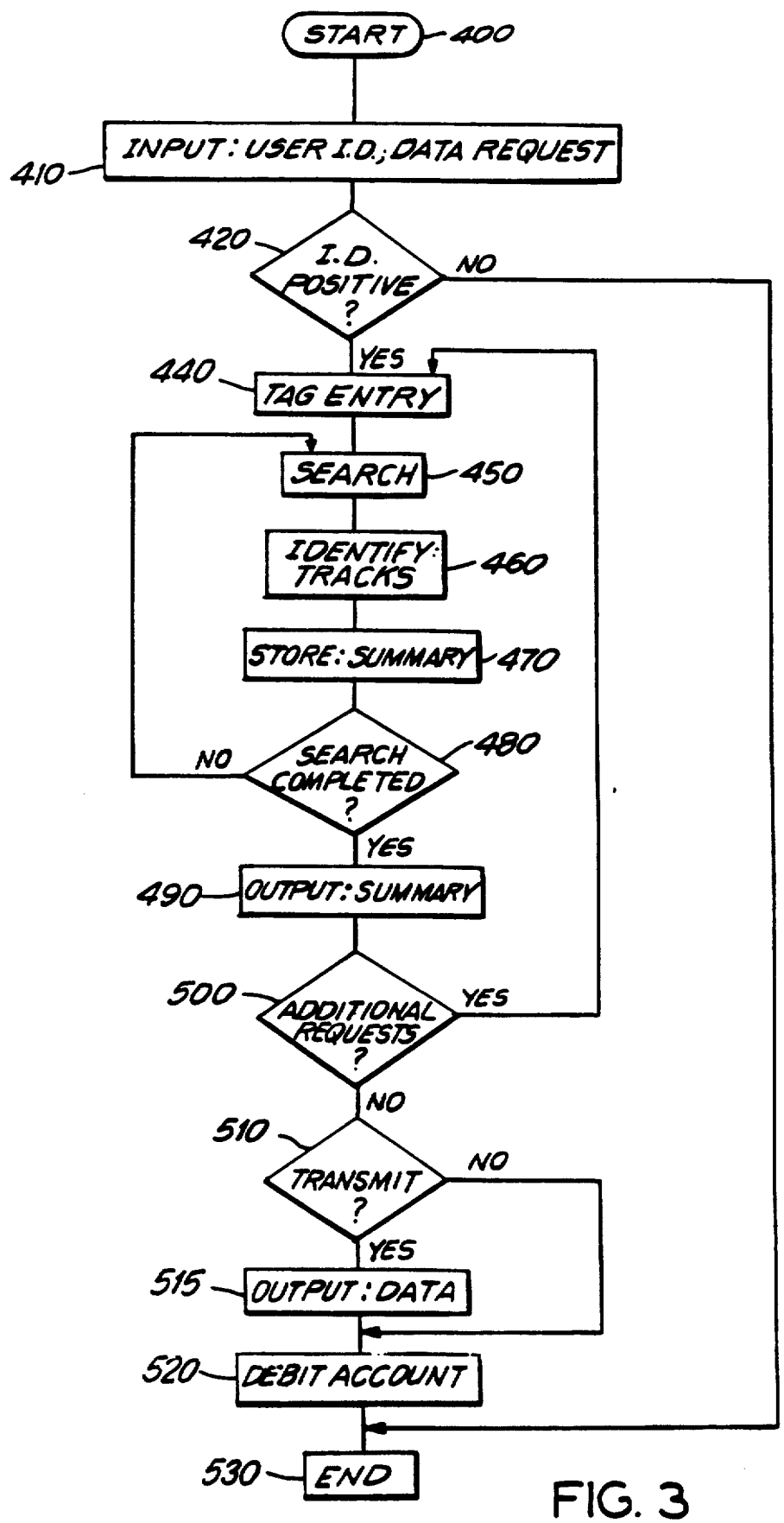
FIG. 3 is a logic flow chart for the control functions of the transmission system in accordance with the present invention.

Referring now to FIG. 3, CPU 100 contains stored program steps per the indicated flow chart logic. A system run is initiated by the user entry into the system is made via a telephone (modem) or similar. The user enters his identification code (I.D.) and the specific search request being made. If the I.D. is positive, the CPU enters a "tag" value which operates to identify the search request for all subsequent processing. The requested search is performed through the database coupled to the CPU (In FIG. 1, block 150). A database search is accomplished by per se well known means in that responsive tracks of information are "read" and identified, 460. In addition, a search summary is prepared, 470, which contains the number of responsive tracks found in the data search, and a brief synopsis of the information within these data tracks. This summary is stored in a separate memory cache.

Test 480 determines whether the search has been completed in terms of the user requests. If affirmative, the logic proceeds to block 490, and the search "summary" is conveyed to the user from memory. This is accomplished by a telephone line, via the interactive voice synthesizer (FIG. 1, Block 120). Test 500 determines the need for additional searches; if no, the user is queried on whether the responsive tracks of data representing the requested search are to be transmitted to a user-specified location, 510. If yes to block 510, then the system transmits the tagged search results to the remote receiver specified by the user, block 515. The account is charged, 520, and the run terminated, 530.

In operation, the transmitting system is continually receiving data search requests by subscription based users. These interactive requests are handled in mixed sequential fashion, as the system supports multiple requests concurrently. The heterogeneous nature of the stored data permits random access of the selected video frames from the database. Since the data is transmitted in full video format, information compression from real time permits the system to simultaneously serve multiple users.

Figure 2A:
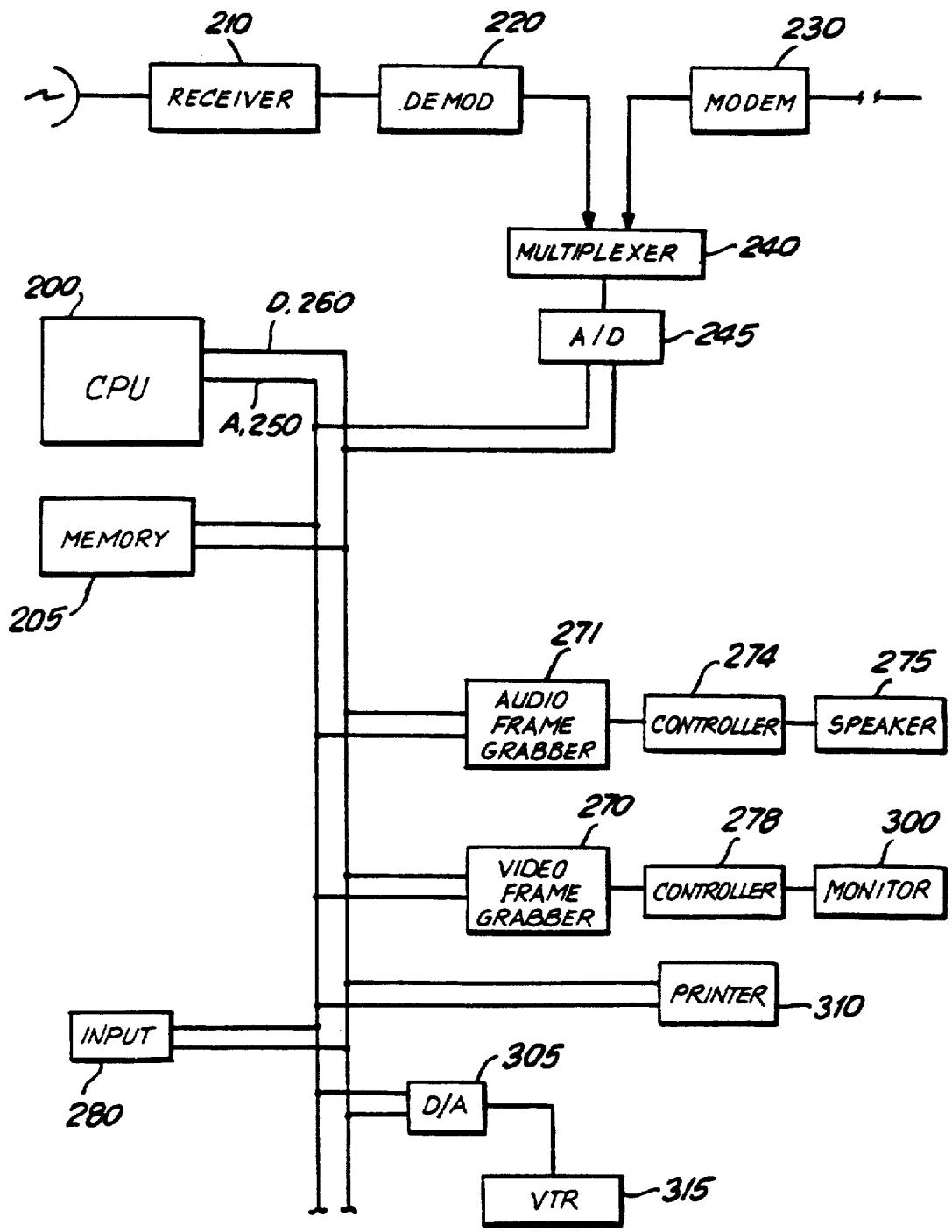
FIG. 2a is a block diagram of the program controlled receiver and display system used in conjunction with the apparatus of FIG. 1 and in accordance with the subject invention.

Now referring to FIG. 2a, the reception system of the present invention is depicted. The transmitted signal generated by the transmitter 170 (FIG. 1) is collected by receiver 210. The mode of transmission is not particularly limiting; the transmission is video based on industry or government set standards, e.g. 30 video frames per second. Also the transmitter and receiver must be compatible to the particular transmission system selected. Possible modes of transmission include microwave broadcast, cable, UHF/VHF, and satellite systems, or combinations thereof. The incoming signal is demodulated (block 220) by per se well known means, and combined in a multiplexer 240 with information supplied via telephone service. The telephone service input permits, through modem 230, the user and/or service operator to verify that the receiver is properly configured to receive the transmitted data, that the receiver is authorized to receive the transmitted data, and to confirm reception. In this way, multiplexer 240 acts as a gate to the received data prior to conveying this data into memory under the receiver's control.

If the tagged data, as transmitted, properly matches the code of the receiver system, the transmitted data is converted to a digital signal by analog to digital converter 245 and entered into Memory 205 via address and data busses 250 and 260, respectively. In a manner more fully presented below, CPU 200 directs the received data to various output devices, such as a video monitor, audio speaker, printer, block 310 and/or video tape recorder (VTR), block 315 via D/A converter, block 305.

Throughout the process, the data is in the form of individual video frames wherein each frame is labeled or tagged. This tag incorporates information on data type (i.e. image, audio, or text). This permits the CPU to direct the tagged frame to the proper output device in the proper sequence for the requested presentation. If the data presentation is complex, the instructions thereto (i.e., output algorithms) can be stored on a dedicated video frame and subsequently used by the CPU to control the output. For example, the incoming signal may have an initial frame containing output control instructions, a second frame containing a picture image, followed by a series of frames containing audio information, somewhat analogous to a slide presentation. CPU 200 recognizes the initial output control frame, reads the control algorithm and directs the second, labeled image frame with the picture image to image frame grabber 270 with instructions to "grab" and circulate that image on monitor 300 for a certain length of time, this time corresponding to the duration of the audio output. The subsequent frames containing the audio information are directed to audio frame grabber 271 with instructions to drive speaker 275 with the audio signal. This directed output via CPU 200 is by per se well known means of driving peripheral devices.

As mentioned, image frame grabber 270 "grabs" the picture image frame and stores the frame in RAM memory. This image is directed to monitor 300 by controller 278 wherein it "refreshes" the screen display at a rate of 30 frames per second providing the picture image without associated image "flicker". This single image frame is held on the display for a time period determined for that particular presentation.

The audio frame grabber 271 "grabs" the video frames containing audio information and produces an audio output therefrom. In this regard, the grabbed frame is "read" providing a certain time length of audio information to the speaker block 275 via controller, block 274, e.g. 10 seconds per frame, in conjunction with the concurrently running video image on monitor 300. Although, the audio and image frame grabbers are diagrammatically discrete, this is for illustration of the above principles. A single frame grabber can be employed to perform the above functions.

Figure 2B:
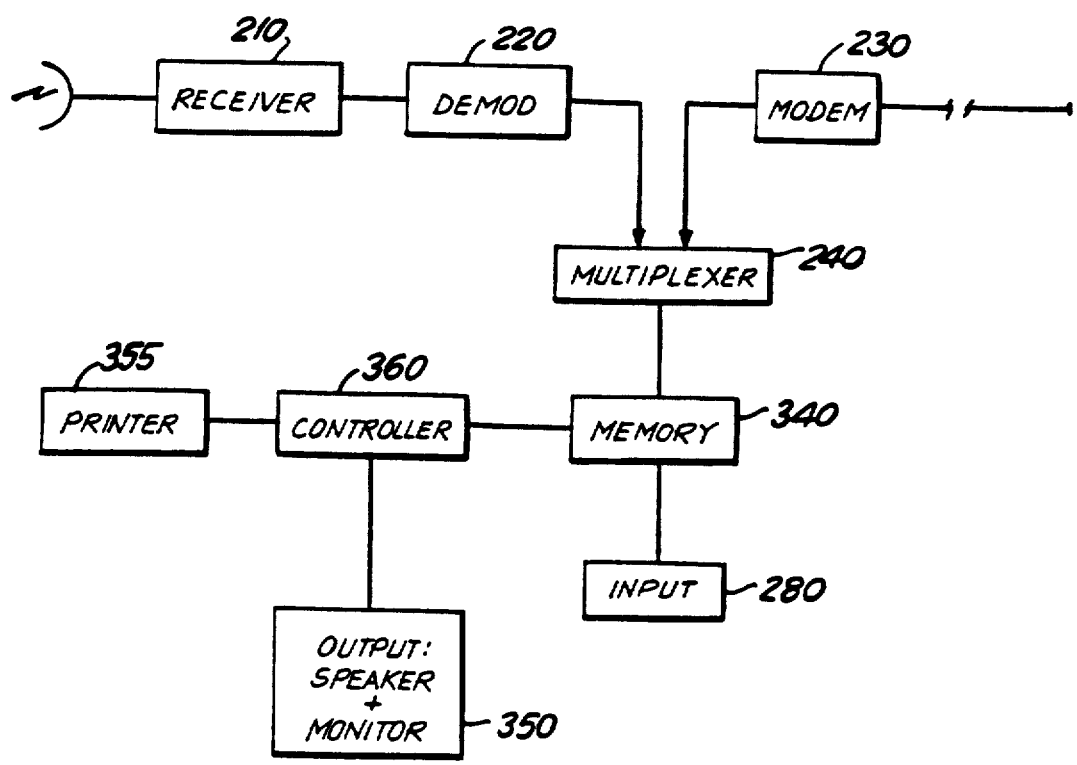
FIG. 2b is a block diagram of an alternative arrangement for the receiver system.

An alternative reception process is diagrammed in FIG. 2b. More specifically, the reception system depicted in FIGS. 2a and 2b are the same through to multiplexer 240. In FIG. 2b, the output of multiplexer 240 is in the form of demodulated broadcast video, tagged for that receiver location and at prevailing industry set standards, e.g. 30 frames per second. This signal is fed to memory device 340, in unconverted analog form. An example of memory device 340 is an analog "frame grabber" floppy disk drive which is capable of storing video frames on individual tracks in a magnetic recording medium. The output of the recorded tracks is directed by controller 360, to the various output devices 350, e.g. speaker and monitor or printer, block 355, pursuant to instructions found on each frame. Again controller 360 and memory device 340 are only shown as discrete devices for understanding of the principles involved.

The systems in FIG. 2a and 2b both incorporate input 280, allowing a user to direct and control the output. This input means can be in the form of a keyboard or similar device, wherein the user can enter commands to the system.

Figure 4:
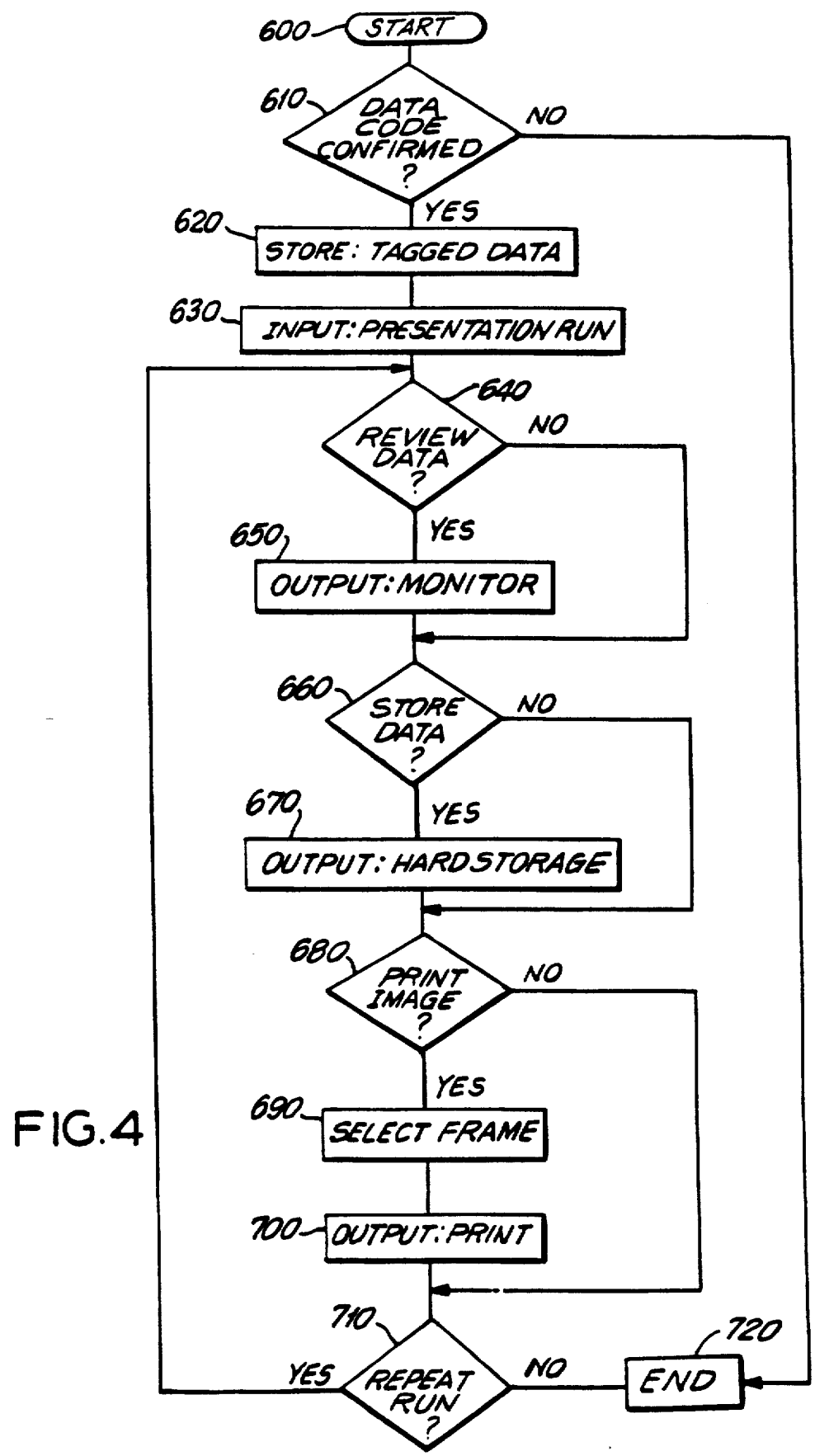
FIG. 4 is a logic flow chart for the control functions of the recovering system in accordance with the subject invention.

Referring now to FIG. 4, a logic flow chart is presented for the video receiver system. Although in practice, the receiver would be continuously receiving and confirming coded data, this is conceptually presented as initiated by the reception of a transmission compatible with the system, 600, and confirmation of the tagged data as properly matched and expected by the system, Test 610. If the stream of data, in the form of video frames, does not match expected system codes, it is rejected (No to test 610) and the run is conceptually complete, 720. Alternatively, if the incoming video frames are properly tagged, or a portion thereof, then the system recognizes the frames and stores the data in the form of video frames in memory 620. As discussed above, this memory can be one of many industry recognized systems including magnetic based floppy disk and hard disk devices.

As stored, the video based images are now available for review by the system user, 630. Test 640 queries whether the user desires a real time display of the stored data. If yes, the system directs the video frames representing picture images to the monitor 650 in a manner corresponding to that particular presentation. The video based audio information is reformatted to audio output and similarly directed to output via a loudspeaker, either discrete or integrated with the monitor.

Test 660 determines whether the user desires to store the data on a hard storage device, such as a VTR. If "yes", then the output is directed to hard storage, 670. Similarly, Test 680 determines whether the operator desires to print individual video frames. If "yes" the desired frames are identified, 690, and the output directed to a suitable printer device, 700.

A second run through the same data is possible, Test 710, with the run conceptually completed at 720. Although the logic shown is hierarchial in form, this is chosen mostly for enhancing explanation of the logic path. It may be more desirable to present the various options in the system to the user in concurrent "menu driven" format by per se well known techniques.

The properties of the above system will be more fully recognized as operating in the context of the following example.

EXAMPLE

In the Real Estate market, Realtors operate locally through agents. These agents take potential customers (homebuyers) as prospects to houses listed or advertised for sale on the market. In addition, these agents continually visit other houses on the market and consult with listing systems, such as the Multiple Listing Service (MLS) to measure the inventory of houses on the market and to match suitable houses to prospects. The present invention operates to increase the efficiency of the agent in performance of these functons.

More particularly, a client visits an agent at his office, requesting information about four bedroom homes in a given neighborhood and within a certain price range. The agent contacts an operating service equipped with the present invention via conventional telephone lines, provides the access code to the system, and describes his search request. This telephone link directly accesses the system. For example, the system iteratively asks the agent to characterize his search request by a series of choices, such as commercial or residential, condominium or detached home, etc. to which the agent responds by touch tone entry of designated numbers.

Once the search is properly characterized and the agent's access code recognized, the system identifies the information tracks responsive to the requested search. These tracks comprise image, audio, and text data in the form of video frames. In addition, the requested data is tagged with the agent's access code, location code, and other information to facilitate system operation. Finally, a data search summary is separately stored, summarizing the contents of the responsive information tracks.

The system presents the summary of the data retrieved by system to the agent over the telephone. This summary may include the number of houses found in the search, street address, etc. If the agent is satisfied with the search and wishes to view the information retrieved, the system is instructed to transmit the responsive tracks to the agent's location.

These tracks are transmitted by microwave broadcast in the form of video frames at industry set standards, e.g. 30 frames per second. In this way, the images of 30 different houses can be transmitted to the agent's location in 1 second. Alternatively, information on houses for sale can be prepackaged including separate image frames for varying views of the house, intermixed with audio and/or text information on the house. A one-minute formal presentation for a house comprising three different views (3 image video frames) with 60 seconds of audio (in the form of 6 video frames, each containing 10 seconds of audio) can be transmitted to the agent's location in less than ⅓ of second (total 9 frames of video signal at 30 frames per second transmission rate).

The agent's location is equipped and configured to receive the microwave broadcast signal comprising designated frames of video based data corresponding to presentations on four bedroom homes at the requested price level. The transmitted data is received, identified, and stored in receiving system memory. The agent and his client can review each house, or house presentation at their leisure, store the video information on a video tape recorder for later review, or print individual houses (image video frames) for the client to consider on his own. For the real estate agent, the system provides tremendous access to detailed information about the housing market with minimal time. In addition, since the system compresses real time presentations to a small fraction of the time for transmittal, multiple users can simultaneously access the system.

In a similar and simultaneous manner, the present invention is applied to support a network of travel agents. In this application, the travel agent inquires about specific locations for vacation travel. Video based presentations on hotels, beaches, etc. are transmitted to the agent for review.

Another variation of the present invention is its application for goods-services purchasing, as exemplified by home-buying services. For this application, the customer will interactively requests data on a certain class of products. The description/presentation of these products is transmitted in video frame format to the specified buyer for his subsequent review.

An additional application of the above invention involves high definition television (HDTV). In this case, the system operates to expand the transmitted video signal in real time, so that, upon compression at the user's site, the image has much higher resolution. More particularly, an high resolution image frame containing 100,000 pixels (picture image elements) can be sequenced into four segments of pixal information (e.g., 25,000 pixels) and transmitted as four separate video frames in industry standard 512×480, 30 frames per second format. At the point of reception, these four frames are recombined into the original, high resolution image.

It can be seen that the above system provides significant flexibility in tailoring the transmitted signal to the particular needs of the user. For example, multiple languages can be intergrated into a presentation with a user specifying his language of choice. Additionally, higher quality sound, and multichannel sourcing (stereo) is easily established in video frame format for subsequent retrieval.

Accordingly, the above described invention has been shown to permit the interactive selection of information, the retrieval of this information in video based format for transmission to a remote, identifiable location for storage and subsequent review. The above described arrangement is merely illustrative of the principles of the present invention. Numerous adaptations and modifications thereof will be readily apparent to those skilled in this art without departing from the spirit and scope of the present invention.

I claim:

1. An apparatus for interactive video based communication comprising: a telephone based, multi-user access means for describing a request for information; a random access information storage means for storing plural information tracks; data processing means for receiving said request for information and selectively searching based on said request and generating identifying information indicating information tracks in said information storage means responsive to said request for information; a telephone based communication link means for configuring a plurality of remotely located receivers for selective storage or display of identified information tracks; and transmitting means for transmitting said identified information tracks in video frame format to a plurality of said remotely located receivers, wherein said remotely located receivers include frame grabber means for selectively acquiring transmitted information tracks responsive to said search requests.

2. An apparatus as in claim 1 wherein said data processing means includes tagging means for identifying a type of information found on said information tracks.

3. An apparatus as in claim 2 wherein said tagging means further comprises a means for tagging said identified information tracks in a manner permitting selective reception by said remotely located receiver of the tagged information tracks.

4. An apparatus as in claim 1 wherein said remotely said receiver comprises a gate means for selective storage of said identified information tracks transmitted by said transmitting means.

5. In a system for virtual real time video frame formatted communication wherein a communicated message includes image information encoded and stored on at least one video frame, and audio information encoded and stored on at least one video frame wherein said audio information is compressed in real time, said system comprising: a random access data storage means for storing individual image and/or audio information forming communicated messages in video frame format, a data processing means for selectively identifying and retrieving said communicated message from said random access data storage; a plural reception means; first transmission means for interactive communication with said data processing means and for configuring said plural reception means to selectively receive the communicated messages; and a second transmission means connected to said data processing means for transmitting retrieved communicated messages to said plural reception means in video frame format, for re-expansion and display at said plural reception means.

6. The system of claim 5, wherein the first transmission means is a telephone link.

7. The system of claim 6, wherein said communicated message includes plural frames comprising a high definition image.

8. The system of claim 7 wherein said plural reception means comprise audio expansion means for converting said compressed audio signal in real time.

9. The system of claim 8, wherein said reception means further comprise a frame grabber means for storing said transmitted communicated message.

10. The system of claim 1, wherein said information tracks comprise high resolution image information wherein plural individual video frames each form a fractional portion of said high resolution image.

11. The system of claim 1, wherein said information tracks comprise compressed audio information.

* * * * *